United States Patent [19]
Miyazaki

[11] Patent Number: 5,660,654
[45] Date of Patent: Aug. 26, 1997

[54] HEAVY DUTY RADIAL TIRE WITH AT LEAST THREE STEEL CORD BELT PLIES

[75] Inventor: Tatsuya Miyazaki, Kobe, Japan

[73] Assignee: Sumitomo Rubber Industries, Ltd., Hyogo-ken, Japan

[21] Appl. No.: 491,288

[22] Filed: Jun. 16, 1995

[30] Foreign Application Priority Data

Mar. 7, 1995 [JP] Japan ................................ 7-077282

[51] Int. Cl.$^6$ .......................... B60C 9/18; B60C 9/20
[52] U.S. Cl. .................. 152/534; 152/526; 152/527; 152/532; 152/538
[58] Field of Search ............................. 152/526, 527, 152/532, 534, 535, 538

[56] References Cited

U.S. PATENT DOCUMENTS

| | | |
|---|---|---|
| 4,235,274 | 11/1980 | Suzuki et al. ................. 152/534 X |
| 4,942,914 | 7/1990 | Takahashi et al. |

FOREIGN PATENT DOCUMENTS

| | | |
|---|---|---|
| 0568870 | 11/1993 | European Pat. Off. |
| 2512747 | 3/1983 | France. |
| 2584343 | 1/1987 | France. |

OTHER PUBLICATIONS

Patent Abstracts Of Japan, vol. 010, No. 342 (M–536) 19 Nov. 1986 & JP-A-61143204 (Yokohama Rubber Co. Ltd.), 30 Jun. 1986.

*Primary Examiner*—Adrienne C. Johnstone
*Attorney, Agent, or Firm*—Birch, Stewart, Kolasch & Birch, LLP

[57] ABSTRACT

A heavy duty radial tire has a belt comprising first, second and third plies disposed in this order from the carcass to the radially outside thereof, each belt ply being made of steel cords laid parallel with each other, the inclining direction of the cords with respect to the tire equator of the first ply being the same as that of the second ply, but reverse to the inclining direction of the third ply, the first belt ply cord angle being 35 to 80 degrees, the second belt ply cord angle being 15 to 30 degrees, and the third belt ply cord angle being 15 to 30 degrees, whereby the belt satisfies (A) the total of the second belt ply strength and the third belt ply strength is 3.4 to 10.0 times the first belt ply strength, and/or (B) the second belt ply strength is in the range of from 1.05 to 2.0 times the third belt ply strength, wherein the strength of each belt ply is defined as the total tensile strength of belt cords in a predetermined unit width of the belt ply.

5 Claims, 3 Drawing Sheets

HEAVY DUTY RADIAL TIRE WITH AT LEAST THREE STEEL CORD BELT PLIES

BACKGROUND AND SUMMARY OF THE INVENTION

The present invention relates to a pneumatic tire, and more particularly to a heavy duty radial tire having an improved belt structure by which the tire strength (breaking energy) is effectively increased while achieving a belt weight reduction.

In a belted radial tire for heavy duty use such as truck/bus tires, it is very important to improve the hoop effect of the belt to withstand a high inner pressure and a heavy tire load. Therefore, such a belt layer generally comprises at least three plies of steel cords.

In such heavy duty radial tires, it is also necessary to increase the breaking energy (plunger energy) for the belt in order to prevent the burst of the tire. A burst of a tire is caused when its belt plies are cut by a sharp object on the road surface, such as stones and rocks. Indeed, Japanese Industrial Standard (JIS-D4230) in other countries requires the breaking energy to score above a regulated value in the tire breaking test.

Hitherto, therefore, the breaking energy is increased by using thicker steel cords for the belt and/or increasing the cord count for each of the belt plies.

However, if the cord diameter and cord count are simply increased, the tire weight and manufacturing cost are greatly increased, and the dynamic tire performance is reduced. Further, the breaking energy sometimes unexpectedly decreases.

Therefore, the present inventor has made various studies and tests, with the following discoveries.

(1) The cords of the second and third plies mainly work as a hoop, and the cords of the first ply works to control a cord movement of the second and third plies.

(2) When a tire treads upon a sharp object, the belt plies deflect towards the radially inside of the tire and at the same time the angle of the belt cords are changed. If the first ply strength is excessively high, the cord movements of the second and third plies are excessively controlled and their cord angles cannot be changed. As a result, the second and third ply cords are liable to be broken.

(3) When the belt plies deflect toward the radially inside the ply locates farther from the sharp object and a larger tensile deformation occurs. Accordingly, the second ply is broken easier than the third ply. On the other hand, the first ply is difficult to break when the cord angle is large and therefore it is soft against bending.

It is therefore, an object of the present invention to provide a heavy duty radial tire, in which the breaking energy is increased without increasing the tire weight.

According to one aspect of the present invention, a heavy duty radial tire comprises a carcass extending between a pair of axially spaced bead portions of the tire, and a belt disposed radially outward of the carcass in a tread portion of the tire, the belt comprising at least three plies including first, second and third plies disposed in this order from the carcass to the radially outside thereof, each belt ply being made of steel cords laid parallel with each other. With respect to the tire equator, the inclining direction of the cords of the first belt ply is the same as the inclining direction of the cords of the second belt ply, but is reverse to the inclining direction of the cords of the third belt ply. The angle of the cords of the first belt ply to the tire equator is 35 to 80 degrees, the angle of the cords of the second belt ply to the tire equator is 15 to 30 degrees, and the angle of the cords of the third belt ply to the tire equator is 15 to 30 degrees. The total of the ply strength of the second belt ply and the ply strength of the third belt ply is 3.4 to 10.0 times the ply strength of the first belt ply, wherein the ply strength of each belt ply is defined as the total tensile strength of belt cords in a predetermined unit width of the belt ply.

According to another aspect of the present invention, a heavy duty radial tire comprises a carcass extending between a pair of axially spaced bead portions of the tire, and a belt is disposed radially outward of the carcass in a tread portion of the tire, the belt comprising at least three plies including first, second and third plies disposed in this order from the carcass to the radially outside thereof, each belt ply being made of steel cords laid parallel with each other. With respect to the tire equator, the inclining direction of the cords of the first belt ply is the same as the inclining direction of the cords of the second belt ply, but reverse to the inclining direction of the cords of the third belt ply. The angle of the cords of the first belt ply to the tire equator is 35 to 80 degrees; the angle of the cords of the second belt ply to the tire equator is 15 to 30 degrees; and the angle of the cords of the third belt ply to the tire equator is 15 to 30 degrees. The ply strength of the second belt ply is 1.05 to 2.0 times the ply strength of the third belt ply, wherein the ply strength of each belt ply is defined as the total tensile strength of belt cords in a predetermined unit width of the belt ply.

In a first aspect, therefore, the movements of the cords of the second and third belt plies are appropriately controlled, and the cords are prevented from being cut, and the breaking energy for the belt can be increased.

Similarly, in a second aspect, as the second belt ply is increased in its strength S2, it becomes possible to withstand its large tensile stress, and the breaking energy can be increased.

Further, when those two aspects are combined, the breaking energy is remarkably increased.

In either case, as the cord angles of the second and third belt plies is relatively small, those plies display a tight hoop effect, and the cords of the first belt ply appropriately control the movements of the second and third belt ply cords. Further, the cords of the first-third plies form a truss structure to provide a desirable rigidity for the belt.

BRIEF DESCRIPTION OF THE DRAWINGS

Embodiments of the present invention will now be described in conjunction with the drawings, wherein.

DETAILED DESCRIPTION OF THE INVENTION

Figure 1:
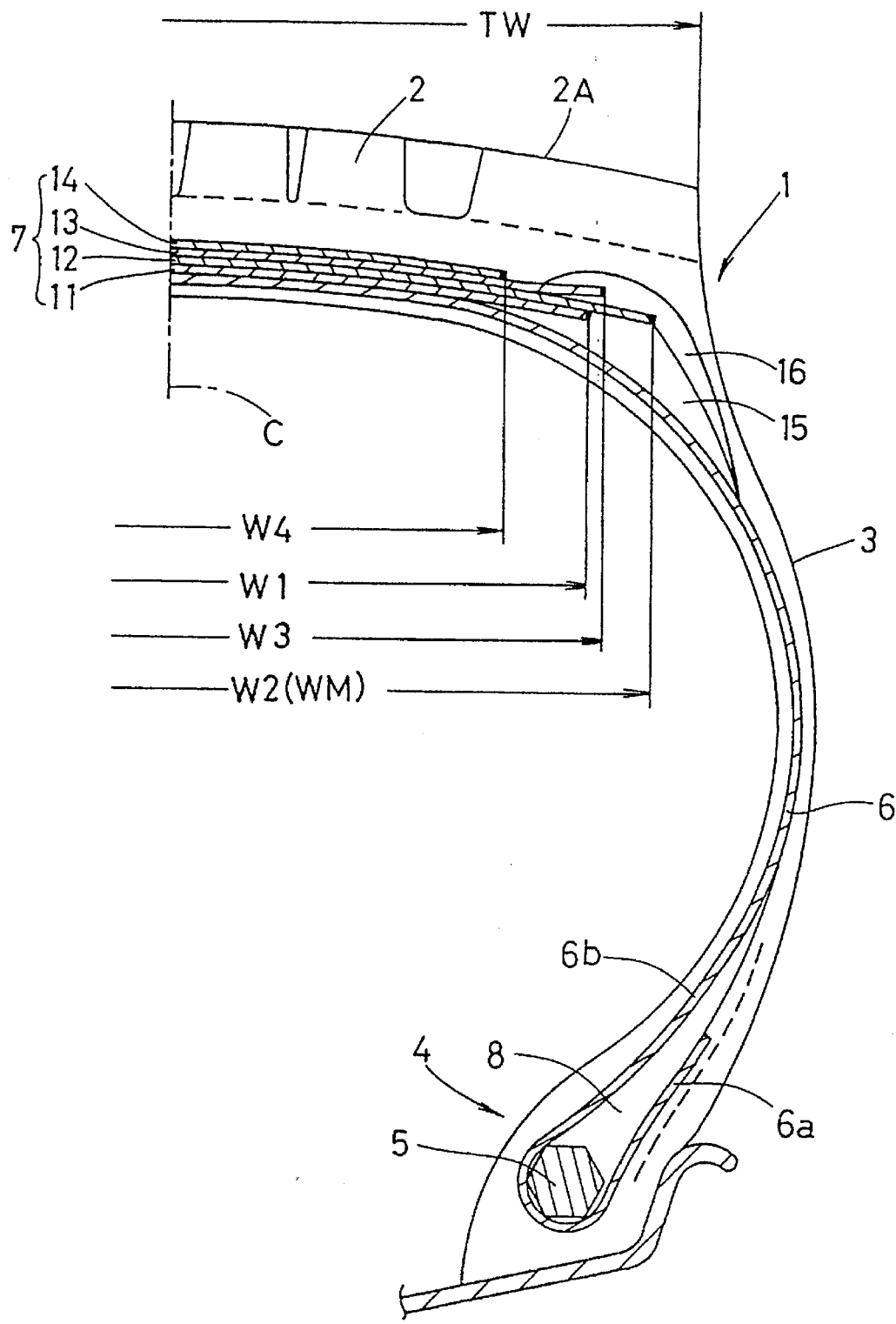
FIG. 1 is a cross sectional view of an embodiment of the present invention.

In the figures, the heavy duty radial tire 1 comprises a tread portion 2 with tread edges,

- a pair of axially spaced bead portions with a bead core 5 therein,
- a pair of sidewall portions 3 extending radially inwardly from the tread edges to the bead portions,
- a toroidal carcass 6 extending between the bead portions 4 through the tread portion 2 and sidewall portions 3, and
- a belt 7 disposed on the radially outside of the carcass 6 in the tread portion 2.

The carcass 6 comprises at least one ply of cords extending between the bead portions 4 and turned up around the bead cores 5 from the inside to outside of the tire to form a pair of turnup portions 6a and a main portion 6b therebetween. The turnup portions 6a terminate above the bead tore 5 and below the maximum tire width position. The carcass ply cords are arranged radially at an angle of 75 to 90 degrees with respect to the tire equator C. Preferably and in this embodiment, the carcass 6 comprises only one ply of steel cords arranged radially at 90 degrees. However, the carcass 6 may be comprised of a plurality of organic fiber cords, e.g., an aromatic polyamide, nylon, rayon, polyester and the like.

In order to increase the lateral stiffness of the tire, each bead portion 4 is provided with a bead apex 8 between the turnup portion 6a and main portion 6b. The bead apex 8 is made of a hard rubber compound extending radially outwardly from the bead core 5 so as to reinforce the bead portion 4 and lower sidewall portion.

In this embodiment, the belt 7 consists of four plies; a first ply 11, second ply 12, third ply 13 and fourth ply 14, which are disposed in this order from the carcass 6 towards the tread face 2A.

Each of the belt plies 11, 12, 13 and 14 is made of steel cords 20 laid parallel to each other. Each belt cord 20 is made of steel filaments twisted together.

The axial width W2 of the second belt ply 12 is larger than the axial width W1 of the first belt ply 11.

The axial width W3 of the third belt ply 13 is substantially the same as, but slightly larger than the width W1.

The second belt ply 12 is widest in the four belt plies, and the width W2 has a maximum value WM, which is set in the range of from 0.80 to 0.98 times the tread width TW, whereby a substantially overall width of the tread portion 5 is reinforced.

The fourth belt ply 14 is narrowest, and its width W4 has a minimum value. Ply 14 works mainly to protect the inner belt plies 11, 12 and 13 and thereby increases the cut resistance of the tread portion.

In each tread edge portion, cushion rubber layers 15 and 16 are disposed so as to cover the edges of the first-third belt plies 11–13 to mitigate stress concentration. Since the inner cushion rubber layer 15 has a tapered axial inner edge, the space between the carcass and the belt 7 or the first belt ply 11 is gradually increased towards the axially outside. The whole width of the first belt ply 11 contacts with the second belt ply 12, but the edge of the third belt ply 13 is spaced therefrom and the space is filled with the rubber layer 16.

Figure 2:
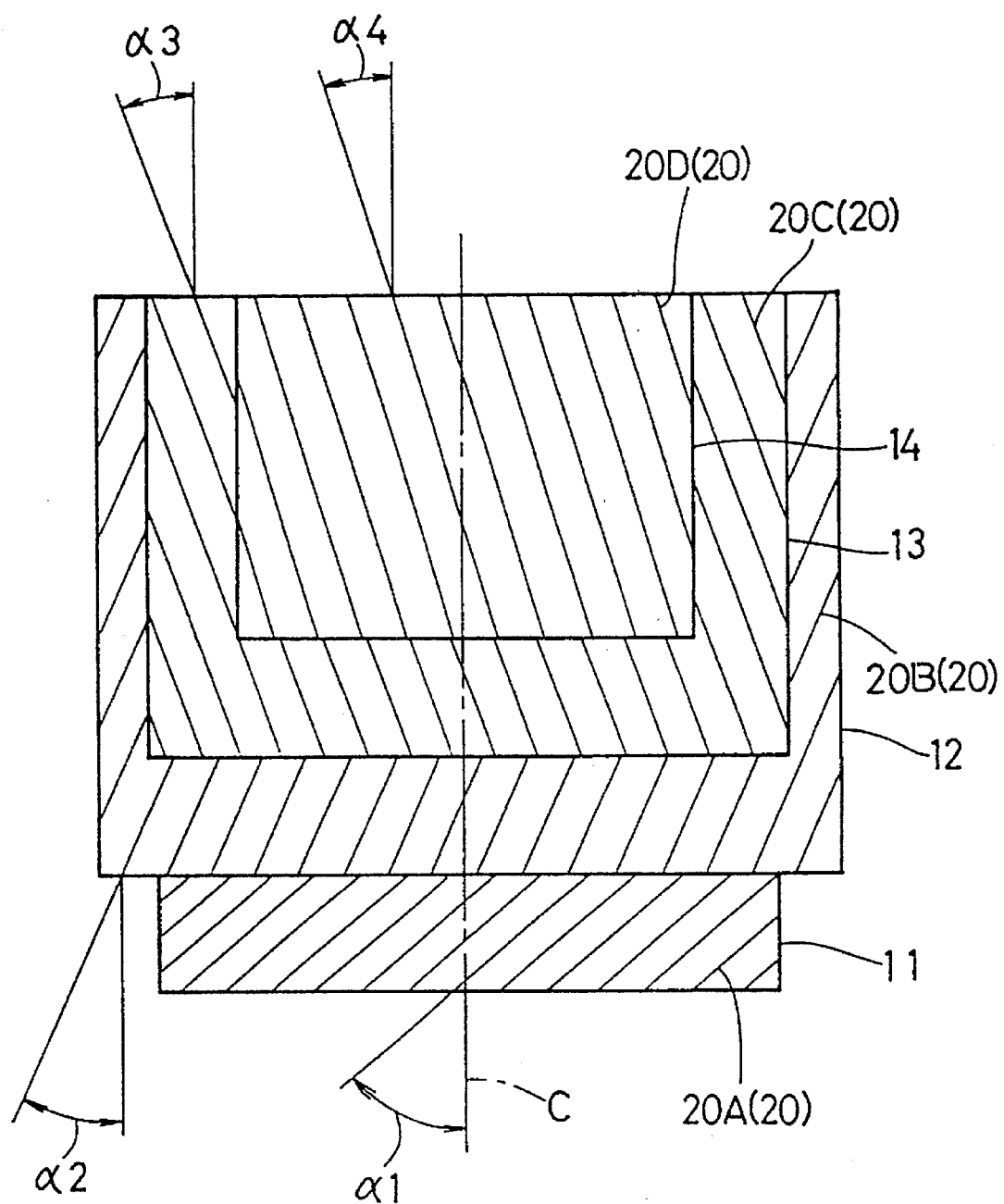
FIG. 2 is a plan view showing an example of the belt thereof.

As shown in FIG. 2, the belt cords 20A and 20B of the first and second belt plies 11 and 12, respectively, are inclined with respect to the tire equator C towards a certain direction, for example, towards the right side, so as to have different right-side upward inclinations.

The belt cords 20C and 20D of the third and fourth belt plies 13 and 14, respectively, are inclined to the reverse direction to that of the belt cords 20A and 20B (in FIG. 2, therefore, towards the left side so as to have different left-side-upward inclinations).

Figure 3:
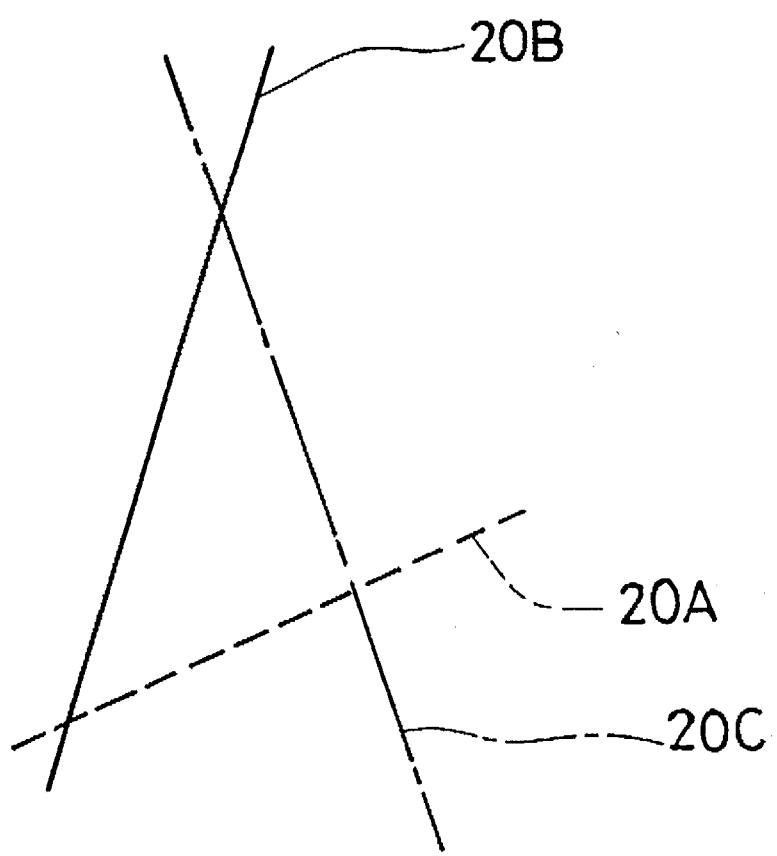
FIG. 3 is a diagram for explaining the crossing state of the cords of the first, second and third belt plies.

The angle $\alpha 1$, $\alpha 2$ and $\alpha 3$ to the tire equator C, of the belt cords 20A, 20B and 20C respectively are:

$$35 \text{ degrees} \leq \alpha 1 \leq 80 \text{ degrees} \quad (1)$$

$$15 \text{ degrees} \leq \alpha 2 \leq 30 \text{ degrees} \quad (2)$$

$$15 \text{ degrees} \leq \alpha 3 \leq 30 \text{ degrees} \quad (3)$$

whereby, as shown in FIG. 3, the belt cords 20A, 20B and 20C form a stiff truss structure, and a desired belt rigidity is provided to maintain the steering stability.

According to one aspect of the present invention, the ply strength S1 of the first belt ply 11 is set to be smaller than either of the ply strength S2 of the second belt ply 12 and the ply strength S3 of the third belt ply 13.

$$S1 < S2$$

$$S1 < S3$$

The sum total S2+S3 of the ply strengths S2 and S3 is set in the range of 3.4 to 10.0 times the ply strength S1.

$$3.4 \ S1 \leq (S2+S3) \leq 10.0 \ S1 \quad (4)$$

Here, the ply strength S is the tensile rupture strength of the belt ply per unit width. In this embodiment, the ply strength Si is defined as the product Ei×Ni of the tensile strength Ei of one belt cord 20 in a ply and the cord count Ni of the ply per unit width, for example 5 cm width, in the direction at a right angle to the belt cords. (i=1, 2 and 3)

$$S1 = E1 \times N1$$

$$S2 = E2 \times N2$$

$$S3 = E3 \times N3$$

As a result, in the above-mentioned truss structure, the movement of the belt cords 20B and 20C is appropriately reduced, but the angles of the belt cords 20B, 20C can be changed relatively easily when the tire treads upon a sharp object and the tread portion is deflected radially inwardly. Therefore, the breaking energy for the belt is increased, and the cord breakage in the second and third belt plies 12 and 13 is effectivly prevented.

When the sum total (S2+S3) is less than 3.4 times S1, the movement of the belt cords 20B and 20C is excessively controlled, which results in cord breakage in the second and third belt plies 12 and 13. When the sum total (S2+S3) is more than 10.0 times S1, the truss structure loses its balance, and the belt rigidity greatly decreases, which results in uneven wear. Further, the cornering force decreases to cause deterioration in the steering stability.

The lower limit for the total (S2+S3) is more preferably 4.0 times S1. The upper limit is more preferably 7.0 times S1, still more preferably 4.8 times S1.

Further, in the belt 7 in this example, the ply strength S2 of the second belt ply 12 is set to be larger than the ply strength S3 of the third belt ply 13 to meet the following equation (5).

$1.05 \, S3 \leq S2 \leq 2.0 \, S3$  (5)

When the tire treads upon a rock and the like, as the belt plies deflect radially inside, the second belt ply 12 is subjected to a tensile deformation which Is larger than the third belt ply 13. Therefore, by increasing the ply strength S2 of the second belt ply 12 by limiting it within the above-mentioned range, the belt cords 20B are prevented form being broken. In this embodiment, therefore, this effect and the above-mentioned effect from equation (4) are combined to effectively increase the breaking energy for the belt 7.

The cord angle α1 of the first belt ply 11 is not less than 54 degrees, whereby the first belt ply 11 is provided with appropriate flexibility against the bending deformation and the cords thereof are prevented form being broken.

The cord angle α4 of the fourth belt ply 14 is preferably set at substantially the same value as the cord angle α3, that is, within plus or minus 5 degrees, and the ply strength S4 is less than the ply strength S3, so that the forth belt ply 14 does not increase the belt rigidity and does not hinder the above-explained effect.

TEST 1: Tires of size 11R22.5 having the construction shown in FIG. 1 and specifications given in Table 1 were prepared and tested for the breaking energy.

In the test, the breaking energy for each test tire was measured according to the tire strength test specified in Japanese Industrial Standard JIS-D4230. The tire inner pressure was 7.00 kgf/sq.cm, and the rim size was 7.5×22.5.

The results are indicated in Table 1 by an index based on the fact that the reference tire 1 is 100. The larger index is better.

The belt structures used in the test tires are shown in Table 2.

TABLE 1

| Tire | Ex.1 | Ex.2 | Ref.1 | Ref.2 |
| --- | --- | --- | --- | --- |
| First-belt ply | | | | |
| Construction | B | B | A | A |
| Cord angle α1 (deg) | 67 | 67 | 67 | 67 |
| Width W1 (mm) | 145 | 145 | 145 | 145 |
| Strength S1 (kgf/5 cm) | 2110 | 2110 | 3200 | 3200 |
| Cord total weight G1 (g/m) | 65.8 | 65.8 | 106.6 | 106.6 |
| Second belt ply | | | | |
| Construction | C | D | C | D |
| Cord angle α2 (deg) | 18 | 18 | 18 | 18 |
| Width W2 (mm) | 160 | 160 | 160 | 160 |
| Strength S2 (kgf/5 cm) | 4160 | 4980 | 4160 | 4980 |
| Cord total weight G2 (g/m) | 147.2 | 159.4 | 147.2 | 159.4 |
| Third belt ply | | | | |
| Construction | C | D | C | D |

TABLE 1-continued

| Tire | Ex.1 | Ex.2 | Ref.1 | Ref.2 |
| --- | --- | --- | --- | --- |
| Cord angle α3 (deg) | 18 | 18 | 18 | 18 |
| Width W3 (mm) | 140 | 140 | 140 | 140 |
| Strength S3 (kgf/5 cm) | 4160 | 4980 | 4160 | 4980 |
| Cord total weight G3 (g/m) | 147.2 | 159.4 | 147.2 | 159.4 |
| Fourth belt ply | | | | |
| construction | A | A | A | A |
| Cord angle α4 (deg) | 18 | 18 | 18 | 18 |
| Width W4 (mm) | 75 | 75 | 75 | 75 |
| Strength S4 (kgf/5 cm) | 3200 | 3200 | 3200 | 3200 |
| Cord total weight G4 (g/m) | 106.6 | 106.6 | 106.6 | 106.6 |
| Test Results | | | | |
| (S2 + S3)/S1 | 4.0 | 4.7 | 2.6 | 3.1 |
| S2/S3 | 1.0 | 1.0 | 1.0 | 1.0 |
| G0(= G1 + G2 + G3) | 360.2 | 384.6 | 401.0 | 425.4 |
| Breaking energy P (index) | 110 | 125 | 100 | 115 |
| P/G0 | 0.305 | 0.325 | 0.249 | 0.270 |

TABLE 2

| Belt ply | A | B | C | D | E |
| --- | --- | --- | --- | --- | --- |
| Cord structure | 3/0.20 + 6/0.35 | 2 + 7/0.22 | 3/0.20 + 6/0.35 | 3 + 8 + 13/0.23 | 3 + 9 + 15/0.22 |
| Breaking strength E (kgf) of a cord | 160 | 88 | 160 | 249 | 265 |
| Weight of a cord (g/m) | 5.33 | 2.74 | 5.33 | 7.97 | 8.50 |
| Cord count N (/5 cm width) | 20 | 24 | 26 | 20 | 20 |
| Ply strength S(= EXN) per 5 cm width | 3200 | 2112 | 4160 | 4980 | 5300 |
| Cord total weight G(= gXN) per 5 cm width | 106.6 | 65.8 | 147.2 | 159.4 | 170 |

As is apparent from Table 1 when comparing Ex.1 with Ref.1 and Ex.2 with Ref.2, by decreasing the ply strength S1 of the first belt ply to a value in the range expressed by the above-mentioned equation (4), the breaking energy could be increased and at the same time the cord weight of the first-third belt plies is decreased.

According to the other aspect of the present invention, the ply strength S2 of the second belt ply 12 is set in the range of from 1.05 to 2.0 times the ply strength S3 of the third belt ply 13. This limitation is the same as equation (5). In other words, the limitation by the above-explained equation (5) is effective either alone or in combination with the limitation of equation (4).

When the ply strength S2 is less than 1.05 times the ply strength S3, the prevention of breaking of the second belt ply cords becomes insufficient. When S2 is more than 2.0 times S3, the third belt ply 13 becomes weak and causes cord breakage.

TEST 2: Test tires of size 12.00R24 mounted on a rim of size 8.50V×24 and inflated to an inner pressure of 7.75 kgf/sq.cm were measured for the breaking energy in the same way as in the above-mentioned test.

The tires had the construction shown in FIG. 1 and specifications given in Table 3. The belt structures used in the test tires are also given in Table 2.

The results are indicated in Table 3 by an index based on the fact that the reference tire 3 is 100. The larger index is better.

TABLE 3

| Tire | Ex.3 | Ex.4 | Ex.5 | Ref.3 | Ref.4 | Ref.5 | Ref.6 | Ref.7 | Ref.8 |
| --- | --- | --- | --- | --- | --- | --- | --- | --- | --- |
| First belt ply | | | | | | | | | |
| Construction | A | A | A | A | A | A | A | A | A |
| Cord angle $\alpha 1$ (deg) | 67 | 67 | 67 | 67 | 67 | 67 | 67 | 67 | 67 |
| Width W1 (mm) | 165 | 165 | 165 | 165 | 165 | 165 | 165 | 165 | 165 |
| Strength S1 (kgf/5 cm) | 3200 | 3200 | 3200 | 3200 | 3200 | 3200 | 3200 | 3200 | 3200 |
| Cord total weight G1 (g/m) | 106.6 | 106.6 | 106.6 | 106.6 | 106.6 | 106.6 | 106.6 | 106.6 | 106.6 |
| Second belt ply | | | | | | | | | |
| Construction | D | E | E | C | C | C | D | D | E |
| Cord angle $\alpha 2$ (deg) | 21 | 21 | 21 | 21 | 21 | 21 | 21 | 21 | 21 |
| Width W2 (mm) | 190 | 190 | 190 | 190 | 190 | 190 | 190 | 190 | 190 |
| Strength S2 (kgf/5 cm) | 4980 | 5300 | 5300 | 4160 | 4160 | 4160 | 4980 | 4980 | 5300 |
| Cord total weight G2 (g/m) | 159.4 | 170 | 170 | 147.2 | 147.2 | 147.2 | 159.4 | 159.4 | 1702 |
| Third belt ply | | | | | | | | | |
| Construction | C | C | D | C | D | E | D | E | E |
| Cord angle $\alpha 3$ (deg) | 21 | 21 | 21 | 21 | 21 | 21 | 21 | 21 | 21 |
| Width W3 (mm) | 170 | 170 | 170 | 170 | 170 | 170 | 170 | 170 | 170 |
| Strength S3 (kgf/5 cm) | 4160 | 4160 | 4980 | 4160 | 4980 | 5300 | 4980 | 5300 | 5300 |
| Cord total weight G3 (g/m) | 147.2 | 147.2 | 159.4 | 147.2 | 159.4 | 170 | 159.4 | 170 | 170 |
| Fourth belt ply | | | | | | | | | |
| Construction | A | A | A | A | A | A | A | A | A |
| Cord angle $\alpha 4$ (deg) | 18 | 18 | 18 | 18 | 18 | 18 | 18 | 18 | 18 |
| Width W4 (mm) | 130 | 130 | 130 | 130 | 130 | 130 | 130 | 130 | 130 |
| Strength S4 (kgf/5 cm) | 3200 | 3200 | 3200 | 3200 | 3200 | 3200 | 3200 | 3200 | 3200 |
| Cord total weight G4 (g/m) | 106.6 | 106.6 | 106.6 | 106.6 | 106.6 | 106.6 | 106.6 | 106.6 | 106.6 |
| Test Results | | | | | | | | | |
| (S2 + S3)/S1 | 2.86 | 2.96 | 3.21 | 2.6 | 2.86 | 2.96 | 3.11 | 3.21 | 3.31 |
| S2/S3 | 1.20 | 1.27 | 1.06 | 1.00 | 0.83 | 0.78 | 1.00 | 0.94 | 1.00 |
| G0(= G1 + G2 + G3) | 413.2 | 423.8 | 436.0 | 401.0 | 413.2 | 423.8 | 425.4 | 436 | 446.6 |
| Breaking energy P (index) | 127 | 153 | 160 | 100 | 107 | 107 | 133 | 133 | 160 |
| P/G0 | 0.307 | 0.361 | 0.367 | 0.249 | 0.259 | 0.252 | 0.313 | 0.305 | 0.358 |

As is apparent form Table 3 when comparing Ex.3 with Ref.4, Ex.4 with Ref.8 and Ex.5 with Ref. 7, by increasing the ply strength S2 than the ply strength S3 to meet the equation (5), the breaking energy could be increased without increasing the cord weight of the first-third belt plies.

Further, as apparent when comparing Ref.4 with Ref.5, Ref.6 with Ref.7, and Ex.5 with Ref.8, by specifically decreasing the ply strength S3 than the ply strength S2, the cord weight could be decreased without decreasing the breaking energy.

Incidentally, the ply strength S is substantially in proportion to the total weight of the belt cords embedded in a unit width of the belt ply. Accordingly, by adjusting the ply strength S1, S2 and S3 to meet the above-mentioned equation (4) and/or equation (5), the breaking energy for the belt plies can be increased without increasing the tire weight.

As explained above, in the heavy duty radial tires according to the present invention, as the cord directions, cord angles and ply-strength of the first-third belt plies are set at specific ranges, the tire strength (breaking energy) can be increased without increasing the belt weight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A heavy duty radial tire comprising a carcass extending between a pair of axially spaced bead portions of the tire, a belt disposed radially outward of the carcass in a tread portion of the tire, said belt comprising at least three plies including first, second and third plies disposed in this order from the carcass to the radially outside thereof, each belt ply being made of steel cords laid parallel with each other, the inclining direction of the cords of the first belt ply, with respect to the tire equator, being the same as the inclining direction of the cords of the second belt ply, but reverse to the inclining direction of the cords of the third belt ply, the angle of the cords of the first belt ply to the tire equator being 35 to 80 degrees, the angle of the cords of the second belt ply to the tire equator being 15 to 30 degrees, the angle of the cords of the third belt ply to the tire equator being 15 to 30 degrees, and said belt satisfying at least one of the following conditions (A) and (B):

(A) the total of the ply strength of the second belt ply and the ply strength of the third belt ply is 4.0 to 7.0 times the ply strength of the first belt ply;

(B) the ply strength of the second belt ply is in the range of from 1.05 to 2.0 times the ply strength of the third belt ply, wherein the ply strength of each belt ply is defined as the total tensile strength of the belt cords in a predetermined unit width of the belt ply.

2. The heavy duty radial tire according to claim 1, wherein the total of the ply strength of the second belt ply and the ply strength of the third belt ply is 4.0 to 4.8 times the ply strength of the first belt ply.

3. A heavy duty radial tire comprising a carcass extending between a pair of axially spaced bead portions of the tire, a belt disposed radially outward of the carcass in a tread portion of the tire, said belt comprising at least three plies including first, second and third plies disposed in this order from the carcass to the radially outside thereof, each belt ply being made of steel cords laid parallel with each other, the inclining direction of the cords of the first belt ply, with respect to the tire equator, being the same as the inclining direction of the cords of the second belt ply, but reverse to the inclining direction of the cords of the third belt ply, the angle of the cords of the first belt ply to the tire equator being 35 to 80 degrees, the angle of the cords of the second belt ply to the tire equator being 15 to 30 degrees, the angle of the cords of the third belt ply to the tire equator being 15 to 30 degrees, and said belt satisfying the following condition (A):
(A) the total of the ply strength of the second belt ply and the ply strength of the third belt ply is 4.0 to 7.0 times the ply strength of the first belt ply;

wherein the ply strength of each belt ply is defined as the total tensile strength of the belt cords in a predetermined unit width of the belt ply.

4. A heavy duty radial tire comprising a carcass extending between a pair of axially spaced bead portions of the tire, a belt disposed radially outward of the carcass in a tread portion of the tire, said belt comprising at least three plies including first, second and third plies disposed in this order from the carcass to the radially outside thereof, each belt ply being made of steel cords laid parallel with each other, the inclining direction of the cords of the first belt ply, with respect to the tire equator, being the same as the inclining direction of the cords of the second belt ply, but reverse to the inclining direction of the cords of the third belt ply, the angle of the cords of the first belt ply to the tire equator being 35 to 80 degrees, the angle of the cords of the second belt ply to the tire equator being 15 to 30 degrees, the angle of the cords of the third belt ply to the tire equator being 15 to 30 degrees, and said belt satisfying the following condition (B):
(B) the ply strength of the second belt ply is in the range of from 1.05 to 2.0 times the ply strength of the third belt ply;

wherein the ply strength of each belt ply is defined as the total tensile strength of the belt cords in a predetermined unit width of the belt ply.

5. A heavy duty radial tire comprising a carcass extending between a pair of axially spaced bead portions of the tire, a belt disposed radially outward of the carcass in a tread portion of the tire, said belt comprising at least three plies including first, second and third plies disposed in this order from the carcass to the radially outside thereof, each belt ply being made of steel cords laid parallel with each other, the inclining direction of the cords of the first belt ply, with respect to the tire equator, being the same as the inclining direction of the cords of the second belt ply, but reverse to the inclining direction of the cords of the third belt ply, the angle of the cords of the first best ply to the tire equator being 35 to 80 degrees, the angle of the cords of the second belt ply to the tire equator being 15 to 30 degrees, the angle of the cords of the third belt ply to the tire equator being 15 to 30 degrees, and said belt satisfying the following conditions (A) and (B):
(A) the total of the ply strength of the second belt ply and the ply strength of the third belt ply is to 4.0 to 7.0 times the ply strength of the first belt ply;
(B) the ply strength of the second belt ply is in the range of from 1.05 to 2.0 times the ply strength of the third belt ply;

wherein the ply strength of each belt ply is defined as the total tensile strength of the belt cords in a predetermined unit width of the belt ply.

* * * * *